United States Patent
Shimizu

(10) Patent No.: US 10,897,552 B2
(45) Date of Patent: Jan. 19, 2021

(54) IMAGE READING APPARATUS AND ORIGINAL SIZE DETECTION METHOD

(71) Applicant: CANON KABUSHIKI KAISHA, Tokyo (JP)

(72) Inventor: Hiromu Shimizu, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/954,310

(22) Filed: Apr. 16, 2018

(65) Prior Publication Data
US 2018/0309894 A1    Oct. 25, 2018

(30) Foreign Application Priority Data
Apr. 25, 2017   (JP) ................................ 2017-086672

(51) Int. Cl.
*H04N 1/00*   (2006.01)
*H04N 1/047*   (2006.01)

(52) U.S. Cl.
CPC ....... *H04N 1/00997* (2013.01); *H04N 1/0071* (2013.01); *H04N 1/00687* (2013.01); *H04N 1/00713* (2013.01); *H04N 1/00734* (2013.01); *H04N 1/00755* (2013.01); *H04N 1/00779* (2013.01); *H04N 1/0473* (2013.01)

(58) Field of Classification Search
CPC ............ H04N 1/00997; H04N 1/0473; H04N 1/00816; H04N 1/00835; H04N 1/6088; H04N 1/00551; H04N 1/00708; H04N 1/00681; H04N 1/00748; H04N 1/00755; H04N 1/00737; H04N 1/193
See application file for complete search history.

(56) References Cited

U.S. PATENT DOCUMENTS

| 7,471,424 B2 | 12/2008 | Ishido et al. ................ 358/449 |
| 8,035,865 B2 | 10/2011 | Ishido et al. ................ 358/449 |

(Continued)

FOREIGN PATENT DOCUMENTS

| CN | 101489015 | 7/2009 |
| CN | 102377899 | 3/2012 |
| CN | 103259959 | 8/2013 |

OTHER PUBLICATIONS

U.S. Appl. No. 15/839,558, filed Dec. 12, 2017 Inventors: Hiromu Shimizu Title: Image Reading Appartus and Reading Method.

(Continued)

*Primary Examiner* — Iriana Cruz
(74) *Attorney, Agent, or Firm* — Venable LLP

(57) ABSTRACT

An image reading apparatus includes: a reading unit, which is configured to read an original placed on an original table in a main scanning direction by irradiating the original with light; and a sub-scanning size detector, which is configured to detect presence or absence of the original on the original table by radiating invisible rays. When the platen cover forms an angle of equal to or smaller than a first angle with respect to the original table, the image reading apparatus determines a size of the original in a sub-scanning direction in accordance with a detection result acquired from the sub-scanning size detector. When the platen cover forms an angle equal to or smaller than a second angle, which is smaller than the first angle, with respect to the original table, the image reading apparatus determines a size of the original in the main scanning direction.

10 Claims, 7 Drawing Sheets

(56) References Cited

U.S. PATENT DOCUMENTS

| | | | | |
|---|---|---|---|---|
| 8,134,753 | B2 | 3/2012 | Ishido et al. | 358/449 |
| 2004/0165223 | A1* | 8/2004 | Ishido | H04N 1/00713 |
| | | | | 358/449 |
| 2006/0028696 | A1* | 2/2006 | Michiie | G03G 15/607 |
| | | | | 358/474 |
| 2008/0273228 | A1 | 11/2008 | Takano et al. | H04N 1/04 |
| 2009/0080031 | A1 | 3/2009 | Ishido et al. | 358/449 |
| 2010/0033769 | A1* | 2/2010 | Shinkawa | H04N 1/00681 |
| | | | | 358/474 |
| 2012/0033246 | A1 | 2/2012 | Unno | 358/1.14 |
| 2013/0063747 | A1* | 3/2013 | Sugimura | H04N 1/00424 |
| | | | | 358/1.13 |
| 2013/0215480 | A1 | 8/2013 | Iwayama et al. | H04N 1/04 |
| 2013/0256970 | A1* | 10/2013 | Nguyen | B65H 5/00 |
| | | | | 271/3.14 |
| 2015/0249762 | A1* | 9/2015 | Ishida | H04N 1/00713 |
| | | | | 358/497 |
| 2020/0252517 | A1* | 8/2020 | Mizude | H04N 1/0044 |

OTHER PUBLICATIONS

U.S. Appl. No. 15/839,564, filed Dec. 12, 2017 Inventors: Hiromu Shimizu Title: Image Reading Apparatus, Image Forming Apparatus, Reading Method and Image Forming System.
U.S. Appl. No. 15/839,568, filed Dec. 12, 2017 Inventors: Hiromu Shimizu Title: Image Reading Appartus and Image Reading Method.
U.S. Appl. No. 15/954,320, filed Apr. 16, 2018 Inventors: Hiromu Shimizu Title: Image Reading Appartus and Original Size Detection Method.
U.S. Appl. No. 15/839,558, filed Dec. 12, 2017.
U.S. Appl. No. 15/839,564, filed Dec. 12, 2017.
U.S. Appl. No. 15/839,568, filed Dec. 12, 2017.
U.S. Appl. No. 15/954,320, filed Apr. 16, 2018.
CN Office Action dated Sep. 11, 2019 in counterpart CN Application No. 201810356734.1 with English translation.

* cited by examiner

IMAGE READING APPARATUS AND ORIGINAL SIZE DETECTION METHOD

BACKGROUND OF THE INVENTION

Field of the Invention

The present invention relates to an image reading apparatus configured to read an image formed on an original (hereinafter referred to as "original image") and an original size detection method.

An image reading apparatus configured to read an original image while moving a reading unit in a sub-scanning direction with respect to an original placed on an original table can detect a size of the original based on the read original image. For example, the image reading apparatus detects an original edge (original end portion) from the read original image to determine the original size based on a result of the detection. In U.S. Pat. Nos. 7,471,424, 8,035,865, and 8,134,753, there is disclosed an original size detection apparatus, which is configured to detect an original size in a main scanning direction based on an original image read by a reading unit and detect an original size in a sub-scanning direction based on a detection result by a sensor configured to detect presence or absence of an original on an original table. This original size detection apparatus includes a platen cover configured to press the original placed on the original table. The original size detection apparatus reads an original image by irradiating the original with light under a state in which the platen cover is opened with respect to the original table at a predetermined angle.

The original size in the main scanning direction is acquired by determining presence or absence of an original through comparison of a luminance included in a reading result with a predetermined threshold value and referring to a position at which the presence or absence of the original changes. Typically, an original pressing member provided to an original pressing surface of the platen cover has a white color, and an original also has a white color. Therefore, when the original is read under a state in which the original is pressed with the platen cover, there is difficulty in distinguishing presence or absence of the original based on the luminance included in the reading result. In many cases, a reflection type sensor is used as a sensor for use in detection of the original size in the sub-scanning direction (original size detection sensor). There is difficulty in distinguishing presence or absence of an original with the reflection type sensor because the difference in amount of reflected light between the original pressing member and the original is small when the platen cover is in a closed state. For the reasons described above, at the time of detecting the original size, the presence or absence of the original is detected in an open state of the platen cover. That is, light sources of the reading unit and the original size detection sensor are turned on in the open state of the platen cover. In this case, the light emitted from the light sources directly reaches eyes of a user. The user is dazzled by such light having reached the eyes. Therefore, the present invention provides an image reading apparatus, which is configured to detect an original size while preventing a user from being dazzled.

SUMMARY OF THE INVENTION

The image reading apparatus according to the present disclosure includes: an original table for placing an original subjected to reading; a platen cover mounted to the original table so as to be openable and closable with respect to the original table; an angle detector configured to detect a first state in which the platen cover forms a first angle with respect to the original table and a second state in which the platen cover forms a second angle smaller than the first angle with respect to the original table; a reader, which includes an illumination portion for irradiating the original placed on the original table with light and a light receiving portion for receiving reflected light of irradiated light reflected from the original, and is configured to read the original in a main scanning direction in accordance with the reflected light received at the light receiving portion; a sub-scanning size detector configured to detect presence or absence of an original placed on the original table by radiating invisible rays;

an original size determination device configured to determine a size of the original in the main scanning direction in accordance with a reading result by the reader and determine a size of the original in a sub-scanning direction orthogonal to the main scanning direction in accordance with a detection result by the sub-scanning size detector; and a controller configured to: control the original size determination device to acquire a detection result by the sub-scanning size detector in accordance with closing of the platen cover to a first state based on a detection result by the angle detector; and control the illumination portion to emit light in accordance with a change of the platen cover from the first state to a second state.

Further features of the present invention will become apparent from the following description of exemplary embodiments (with reference to the attached drawings).

DESCRIPTION OF THE EMBODIMENTS

An embodiment of the present invention is described below in detail with reference to the drawings.

Overall Configuration

Figure 1:
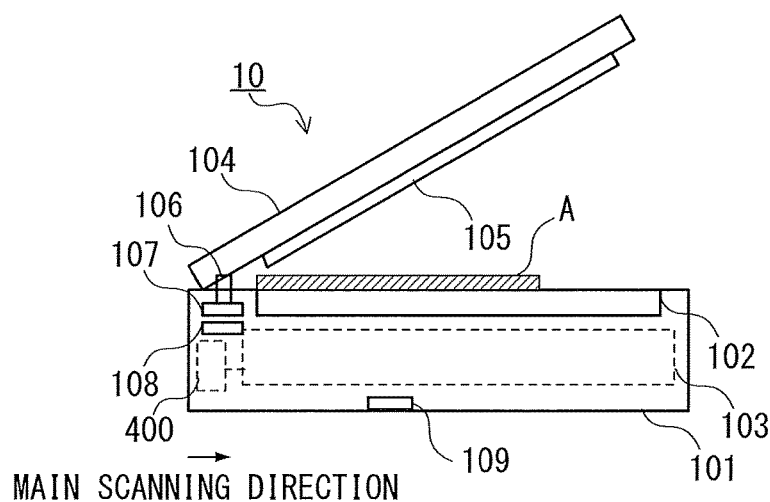
FIG. 1 is a configuration diagram of an image reading apparatus.
Figure 2:
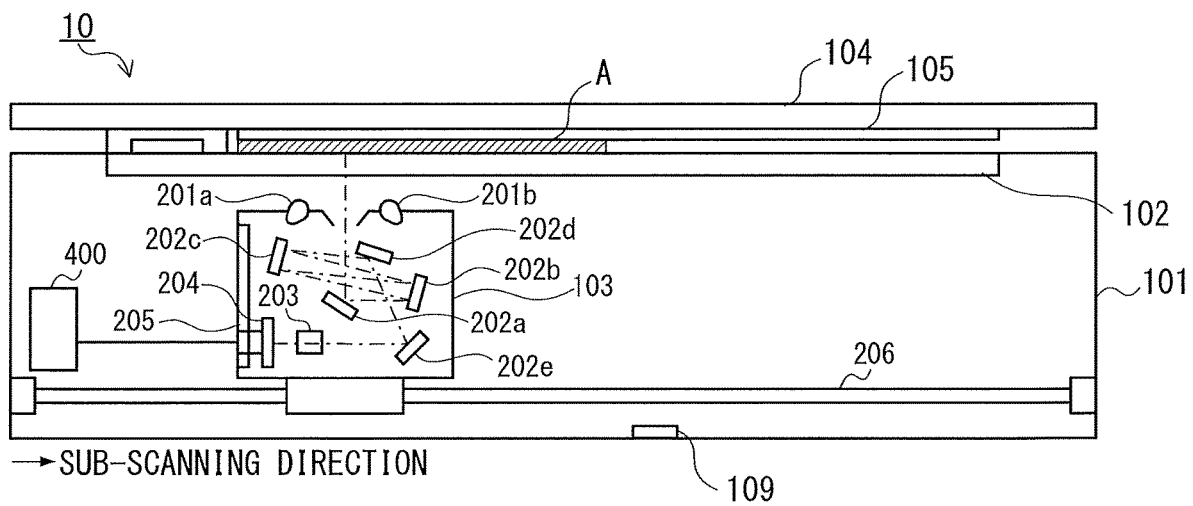
FIG. 2 is a configuration diagram of the image reading apparatus.

FIG. 1 and FIG. 2 are configuration diagrams of an image reading apparatus according to an embodiment of the present invention. An image reading apparatus 10 includes a box-shaped casing 101, an original table 102 on which an original A to be read is to be placed, and a platen cover 104 having mounted thereon an original pressing member 105 configured to press the original A. The original table 102 is formed of a transparent member, for example, glass. The original A is placed so that its surface to be read faces toward the original table 102 side. A surface of the original pressing member 105 on a side of pressing the original A has a white color so that a region outside the region of the original A does not become black at the time of reading. The platen cover 104 can be changed in mounting angle with respect to the casing 101. That is, the platen cover 104 is mounted to the casing 101 so as to be openable and closable with respect to the original table 102. The casing 101 accommodates a reading unit 103 configured to read an original image from the original A, a control unit 400, and a sub-scanning size detector 109.

The reading unit 103 includes illumination portions 201a and 201b, reflective mirrors 202a to 202e, an imaging lens 203, a light receiving portion 204, and a sensor board 205. The illumination portions 201a and 201b irradiate the original A with light. The illumination portions 201a and 201b each include a plurality of light emitting elements such as light emitting diodes (LEDs) that are arranged linearly. The reflective mirrors 202a to 202e construct an optical system for introducing the light reflected from the original A to the imaging lens 203. The imaging lens 203 images the reflective light introduced by the reflective mirrors 202a to 202e to a light receiving surface of the light receiving portion 204.

The light receiving portion 204 outputs an electrical signal based on the reflective light received at the light receiving surface. The electrical signal is an analog signal representing the original image read from the original A. The light receiving portion 204 includes a plurality of photoelectric conversion elements such as charge coupled device (CCD) sensors that are arranged in the same direction as a row of the light emitting elements. The light receiving portion 204 is mounted on the sensor board 205. The sensor board 205 is connected to a control unit 400, and transmits the analog signal output from the light receiving portion 204 to the control unit 400. The configuration of the control unit 400 is described later.

The reading unit 103 having such a configuration reads the original image with a direction of arrangement of the light emitting element rows of the illumination portions 201a and 201b and the photoelectric conversion element row of the light receiving portion 204 serving as a main scanning direction. The reading unit 103 is mounted to a rail 206, and reads the original image while moving on the rail 206. The moving direction of the reading unit 103 serves as a sub-scanning direction orthogonal to the main scanning direction.

The sub-scanning size detector 109 is a reflection type sensor, and is configured to detect presence or absence of reflected light from the original A on the original table 102. The presence or absence of the original A can be distinguished based on a detection result of the reflected light by the sub-scanning size detector 109. With this configuration, the size of the original A in the sub-scanning direction can be detected. The sub-scanning size detector 109 radiates invisible rays such as infrared rays to the original A, and distinguishes the presence or absence of the original A based on reflected light from the original A. Therefore, even when the platen cover 104 is in the open state, a user is not dazzled by light radiated from the sub-scanning size detector 109.

The casing 101 includes a platen cover angle detection flag 106, a first angle detector 107, and a second angle detector 108, which are used for detection of an open/close state of the platen cover 104 with respect to the original table 102. A position of the platen cover angle detection flag 106 changes in accordance with opening and closing of the platen cover 104, and outputs of the first angle detector 107 and the second angle detector 108 change. The first angle detector 107 is turned into an on-state when an angle of the platen cover 104 with respect to the original table 102 is equal to or smaller than a predetermined first angle. The first angle detector 107 is turned into an off-state when an angle of the platen cover 104 with respect to the original table 102 is larger than the first angle. The second angle detector 108 is turned into an on-state when an angle of the platen cover 104 with respect to the original table 102 is equal to or smaller than a predetermined second angle. The second angle detector 108 is turned into an off-state when an angle of the platen cover 104 with respect to the original table 102 is larger than the second angle. The first angle is set to an angle that prevents the sub-scanning size detector 109 being the reflection type sensor from falsely detecting the platen cover 104 as an original. For example, the first angle is set to 15°. The second angle is set to an angle that is smaller than the first angle and is less liable to cause light radiated from the reading unit 103 to eyes of a user. For example, the second angle is set to 0°. The first angle may be other angle larger than 15°, and may be 20°. Further, the second angle may be set to any angle smaller than 15°, for example, may be set to 10° or 5°, as long as the light radiated from the reading unit 103 is less liable to reach eyes of a user having an expected body height.

Figure 3:
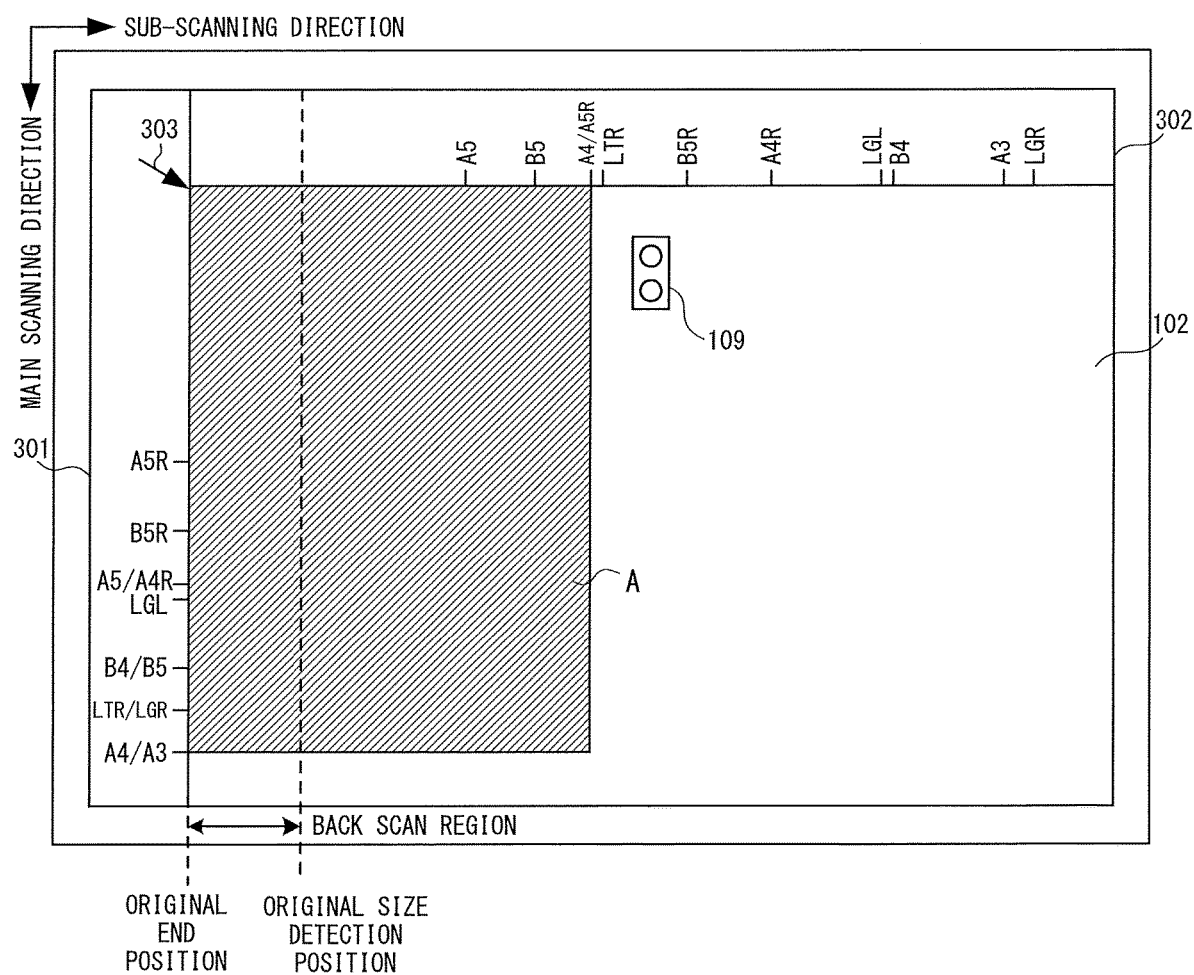
FIG. 3 is an explanatory diagram of an original table side of a casing.

FIG. 3 is an explanatory diagram of the original table 102 side of the casing 101. In the surrounding of the original table 102, a main scanning original size index 301, a sub-scanning original size index 302, and a reference position 303 used when the original A is placed are marked. The original A is placed on the original table 102 so that its corner portion matches with the reference position 303. The main scanning original size index 301 is an index of a reference size in the main scanning direction of the original A placed so as to match with the reference position 303. The sub-scanning original size index 302 is an index of a reference size in the sub-scanning direction of the original A placed so as to match with the reference position 303. In the example of FIG. 3, an A4-sized original A is placed on the original table 102.

The size of the original A in the sub-scanning direction is detected through use of the sub-scanning size detector 109. The sub-scanning size detector 109 is provided between indices of two reference sizes in the sub-scanning direction, and is configured to detect presence or absence of the original A on the original table 102. Based on a detection result by the sub-scanning size detector 109, the size of the original A in the sub-scanning direction is detected. In the example illustrated in FIG. 3, the sub-scanning size detector 109 is provided between "LTR" and "B5R" being indices of two reference sizes. Based on a detection result of the presence or absence of the original A by the sub-scanning size detector 109 provided at this position, the size of the original A in the sub-scanning direction can be distinguished between the size equal to or smaller than "LTR" and the size equal to or larger than "B5R". That is, based on the detection result of the presence or absence of the original A by the sub-scanning size detector 109, the size of the original A in the sub-scanning direction is distinguished between the size equal to or larger than the larger reference size and the size equal to or smaller than the smaller reference size. When the sub-scanning size detector 109 is provided at another position, the size of the original in the sub-scanning direction can be distinguished in accordance with that position. Further, when a plurality of sub-scanning size detectors 109 are arrayed in the sub-scanning direction, more detailed detection of the original size in the sub-scanning direction can be performed.

The original size of the original A in the main scanning direction is started to be detected from an original size detection position. The original A is started to be read from an original end position when the original image is read. The original size detection position is set to a position separated from the original end position in the sub-scanning direction by a predetermined distance. The original end position is a position at which an original image is first read when the original A is read.

At the time of detecting the size in the main scanning direction, when the first angle detector 107 detects the open state of the platen cover 104, the control unit 400 controls the reading unit 103 to move to an original size detection position. After the movement of the reading unit 103, the control unit 400 reads the original A for a predetermined number of lines while controlling the reading unit 103 to move from the original size detection position to the original end position (back scanning). The control unit 400 detects an original edge of the original A based on a reading result by the reading unit 103 to determine the size of the original in the main scanning direction based on the original edge.

Figure 4:
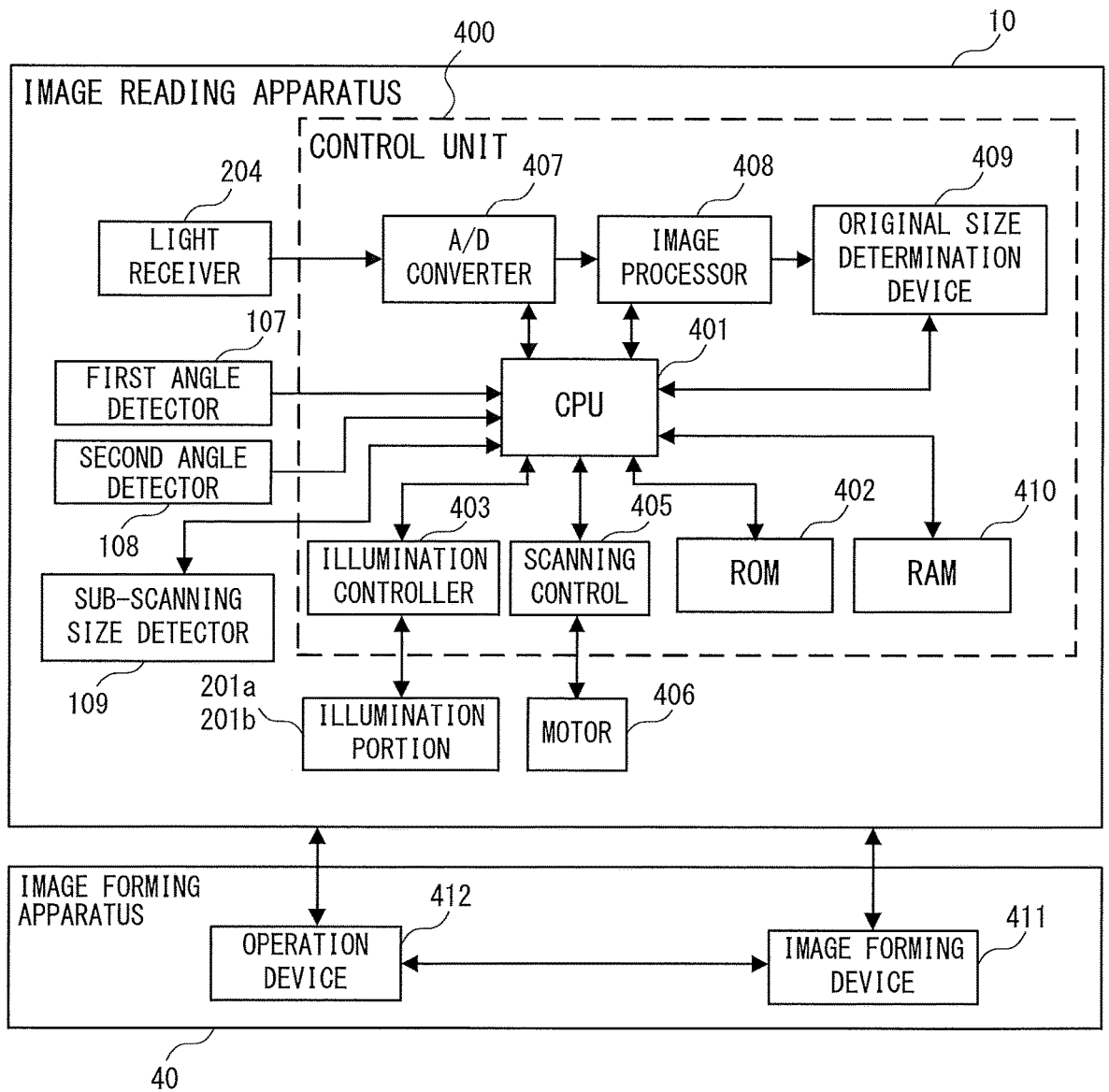
FIG. 4 is an explanatory diagram of a control unit.

FIG. 4 is an explanatory diagram for illustrating the control unit 400. The illumination portions 201a and 201b and the light receiving portion 204 of the reading unit 103, the first angle detector 107, the second angle detector 108, the sub-scanning size detector 109, and a motor 406 are connected to the control unit 400. The motor 406 is a drive source for moving the reading unit 103 along the rail 206. The image reading apparatus 10 is connected to an image forming apparatus 40 such as a copying machine, a printer, or a multifunction peripheral.

The control unit 400 is a computer system including a central processing unit (CPU) 401, a read only memory (ROM) 402, and a random access memory (RAM) 410. The CPU 401 executes a computer program stored in the ROM 402 with use of the RAM 410 as a work area, to thereby control the operation of the image reading apparatus 10. The CPU 401 controls an operation of the sub-scanning size detector 109 to acquire the detection result. The control unit 400 further includes an illumination controller 403 and a scanning controller 405 for controlling the operation of the reading unit 103. The control unit 400 further includes an A/D converter 407 for detecting the original size of the original A, an image processor 408, and an original size determination device 409. The control unit 400 may be achieved by discrete components or one-chip semiconductor products. The one-chip semiconductor products can be achieved by a micro-processing unit (MPU), an application specific integrated circuit (ASIC), and a system-on-a-chip (SOC).

The illumination controller 403 is controlled by the CPU 401 to control the operation of turning on and off the illumination portions 201a and 201b. In this embodiment, the illumination controller 403 turns on the illumination portions 201a and 201b in accordance with a detection result by the second angle detector 108. Specifically, the illumination controller 403 turns on the illumination portions 201a and 201b when the second angle detector 108 detects that the platen cover 104 forms an angle equal to or smaller than the second angle. The scanning controller 405 is controlled by the CPU 401 to transmit a drive signal to the motor 406, to thereby move the reading unit 103 along the rail 206 in the sub-scanning direction at a predetermined speed.

The A/D converter 407 is controlled by the CPU 401 to receive, from the light receiving portion 204, the analog signal representing the original image. The A/D converter 407 converts the analog signal into a digital signal, and transmits the signal to the image processor 408. The image processor 408 is controlled by the CPU 401 to subject the digital signal acquired from the A/D converter 407 to various types of image processing, and generates image data representing the original image read from the original A. The image data is transmitted from the control unit 400 to, for example, the image forming apparatus 40 or a personal computer.

The original size determination device 409 is controlled by the CPU 401 to detect the original edge of the original image based on the image data generated by the image processor 408, and determine the size of the original A in the main scanning direction based on the detected original edge. The original size determination device 409 acquires the detection result by the sub-scanning size detector 109 through the CPU 401, and uses the acquired detection result to determine the size of the original A in the sub-scanning direction. In the example of FIG. 3, when the detection result by the sub-scanning size detector 109 indicates that the original is present, the original size determination device 409 determines that the size of the original A in the sub-scanning direction is equal to or larger than "B5R". When the detection result by the sub-scanning size detector 109 indicates that the original is absent, the original size determination device 409 determines that the size of the original A in the sub-scanning direction is equal to or smaller than "LTR". The original size determination device 409 determines the original size in accordance with the size of the original A in the main scanning direction and the size of the original A in the sub-scanning direction.

The CPU 401 detects an angle of the platen cover 104 based on detection results by the first angle detector 107 and the second angle detector 108. With the fact that the detected angle of the platen cover 104 has reached a predetermined angle as a trigger, the CPU 401 performs detection of the original size of the original A through the original size determination device 409.

The image forming apparatus 40 includes an image forming device 411 and an operation device 412. In accordance with image data acquired from the control unit 400, the image forming device 411 forms an image represented by the image data on a recording material such as a sheet. The image forming device 411 forms an image on a recording material having a size corresponding to the original size determined by the control unit 400. With such action, the original image read by the image reading apparatus 10 is formed on a recording material having an appropriate size. The operation device 412 is a user interface including an input device and an output device. The input device includes, for example, various operation keys or a touch panel. The output device includes, for example, a display. The operation device 412 provides information to a user through the output device, and receives instructions from a user through the input device. The operation device 412 transmits the received instructions to the control unit 400 or the image forming device 411. The operation device 412 may be provided to the image reading apparatus 10.

Figure 5:
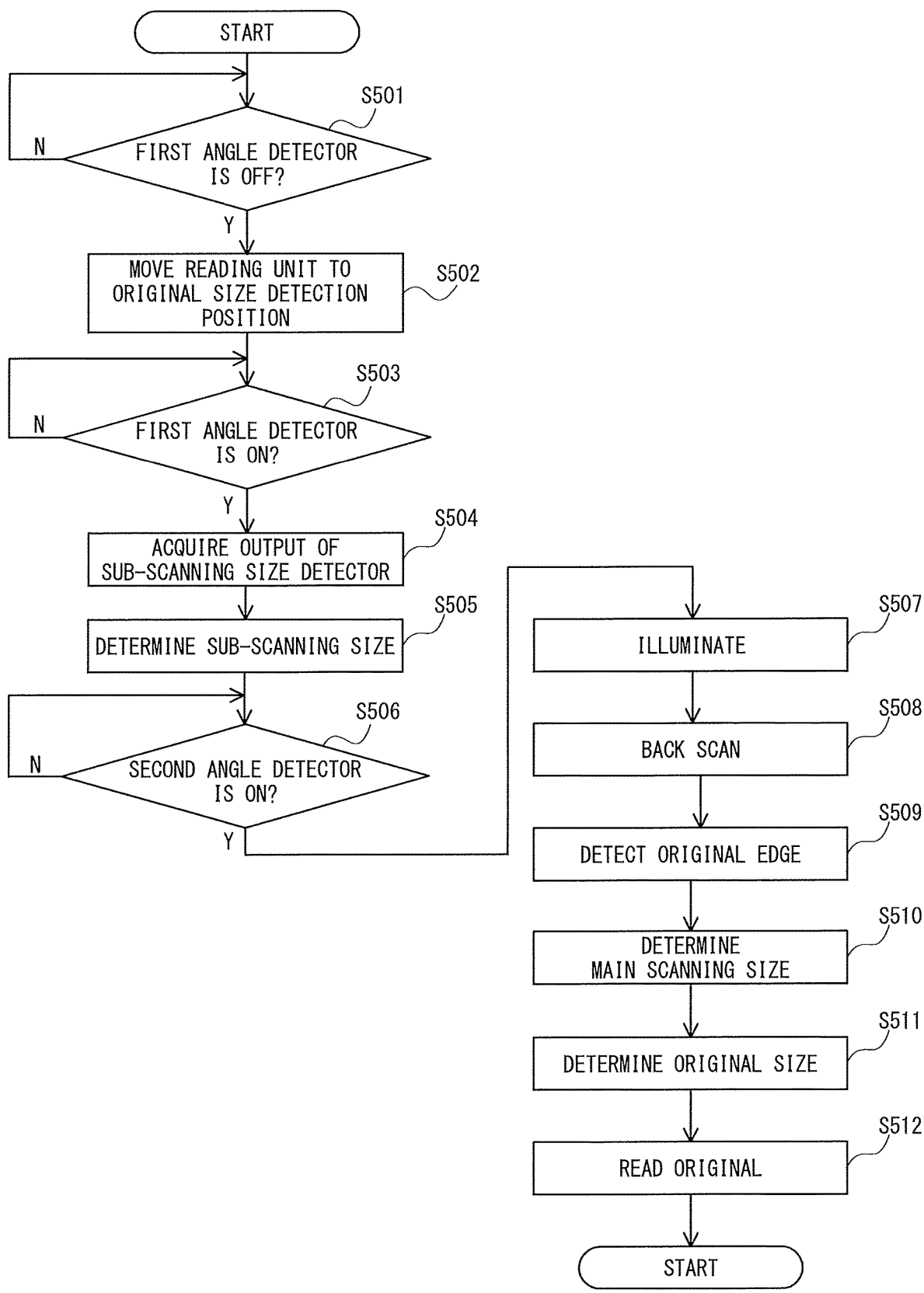
FIG. 5 is a flowchart for illustrating original image reading processing including original size detection processing.

FIG. 5 is a flowchart for illustrating original image reading processing including original size detection processing performed by the image reading apparatus 10.

The control unit 400 determines whether or not the platen cover 104 is opened from an angle equal to or smaller than the first angle to an angle larger than the first angle with respect to the original table 102 in accordance with a change in detection result acquired from the first angle detector 107 (Step S501). When the detection result by the first angle detector 107 is changed from the on-state to the off-state, the control unit 400 determines that the platen cover 104 is shifted from the angle equal to or smaller than the first angle to the angle larger than the first angle with respect to the original table 102. When the platen cover 104 is opened to the angle larger than the first angle with respect to the original table 102 (Step S501: Y), the control unit 400 controls the reading unit 103 to move to the original size detection position (Step S502). At this time, a user places the original A on the original table 102 so that a corner portion of the original A matches with a reference position 303. After that, the control unit 400 determines whether or not the platen cover 104 is closed from the angle larger than the first angle to the angle equal to or smaller than the first angle with respect to the original table 102 in accordance with a change in detection result acquired from the first angle detector 107 (Step S503). When the detection result by the first angle detector 107 is changed from the off-state to the on-state, the control unit 400 determines that the platen cover 104 is closed from the angle larger than the first angle to the angle equal to or smaller than the first angle with respect to the original table 102.

When the platen cover 104 is closed to the angle equal to or smaller than the first angle (Step S503: Y), the control unit 400 acquires a detection result being an output of the sub-scanning size detector 109 (Step S504). The control unit 400 determines the size of the original A in the sub-scanning direction based on the detection result by the sub-scanning size detector 109 (Step S505). When the angle of the platen cover 104 with respect to the original table 102 is at the first angle, invisible rays radiated from the sub-scanning size detector 109 does not reach the platen cover 104. Therefore, at a timing immediately after the platen cover 104 is closed to the angle equal to or smaller than the first angle, the sub-scanning size detector 109 is prevented from falsely detecting the platen cover 104 as the original A.

The control unit 400 having detected the size in the sub-scanning direction determines whether or not the platen cover 104 is closed from an angle larger than the second angle to an angle equal to or smaller than the second angle with respect to the original table 102 in accordance with a change in detection result acquired from the second angle detector 108 (Step S506). When the detection result by the second angle detector 108 is changed from the off-state to the on-state, the control unit 400 determines that the platen cover 104 is closed from the angle larger than the second angle to the angle equal to or smaller than the second angle with respect to the original table 102.

When the platen cover 104 is closed to the angle equal to or smaller than the second angle (Step S506: Y), the control unit 400 turns on the illumination portions 201a and 201b of the reading unit 103 (Step S507). The control unit 400 controls the reading unit 103 to move from the original size detection position to the original end position. With this action, the control unit 400 performs back scanning of reading the original A for a predetermined number of lines (Step S508). Through the back scanning, the control unit 400 acquires an analog signal representing an original image for a predetermined number of lines from the reading unit 103. The platen cover 104 is closed to the angle equal to or smaller than the second angle, and hence the dazzle of light from the illumination portions 201a and 201b felt by a user is suppressed to a minimum level.

The control unit 400 converts the analog signal representing the acquired original image into a digital signal through use of the A/D converter 407 and performs image processing with respect to the digital signal through use of the image processor 408, to thereby generate image data. The control unit 400 detects an original edge of the original A in the main scanning direction through use of the original size determination device 409 based on the image data (Step S509). Details of the original edge detection processing are described later. The control unit 400 determines the size of the original A in the main scanning direction based on the detected original edge (Step S510). The control unit 400 determines the original size of the original A based on the size of the original A in the sub-scanning direction determined in Step S505 and the size of the original A in the main scanning direction determined in Step S510 (Step S511).

After the determination of the original size, the control unit 400 controls an operation of the reading unit 103 to read the original image of the original A placed on the original table 102 (Step S512). A user places the original A on the original table 102, and thereafter operates the operation device 412 to give an instruction of reading an original image to the image reading apparatus 10. The operation device 412 transmits an instruction of reading an original image to the control unit 400 in accordance with the operation by the user. The control unit 400 acquires the instruction of reading an original image from the operation device 412 to start reading an original image.

With the processing described above, an original size of the original A placed on the original table 102 is determined, and an original image is read. Image data representing the read original image is, for example, transmitted to the image forming apparatus 40 and used for image forming processing on a recording material by the image forming device 411.

Figure 6:
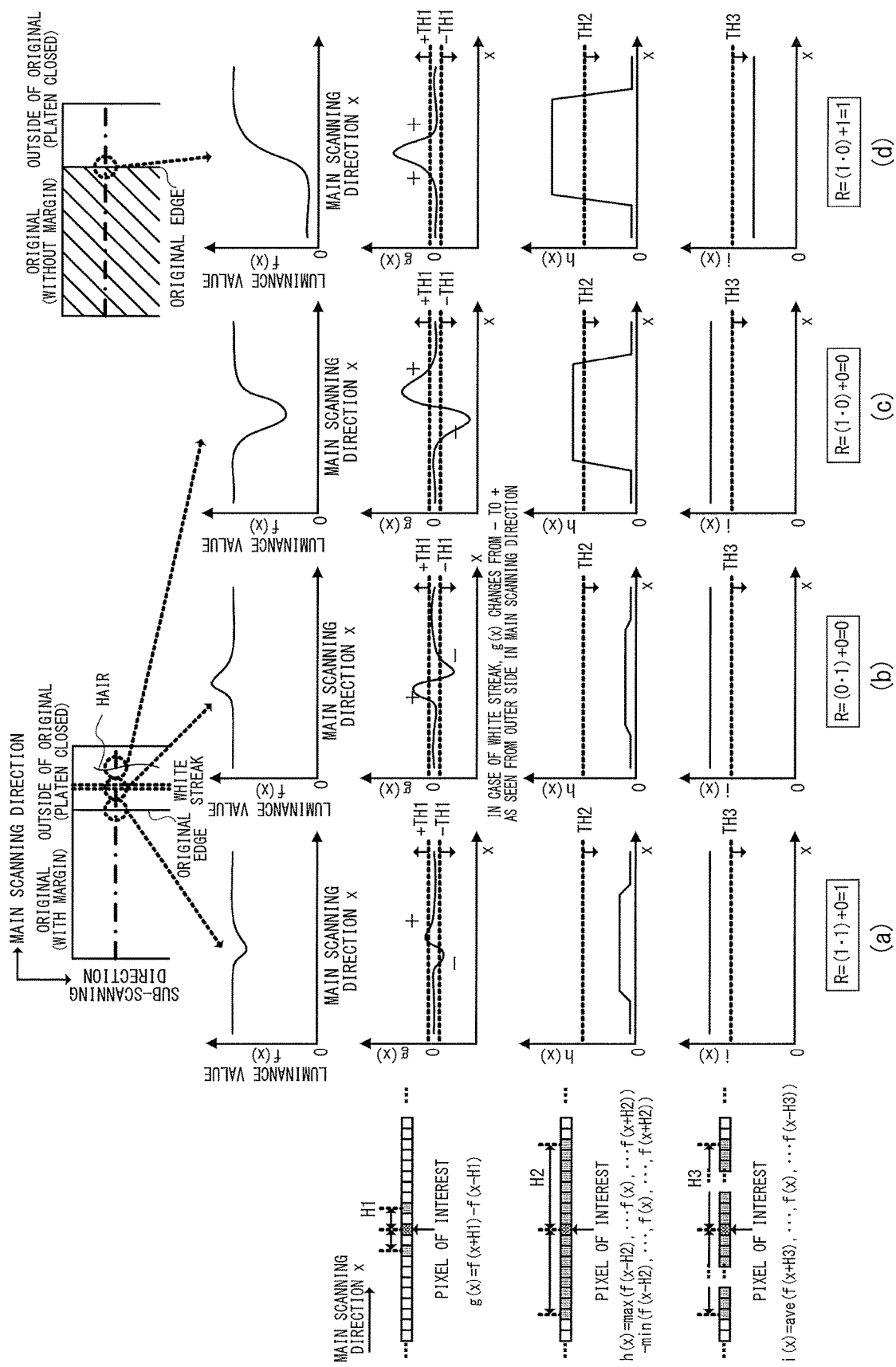
FIG. 6 is an explanatory diagram for illustrating original edge detection processing.
Figure 7:
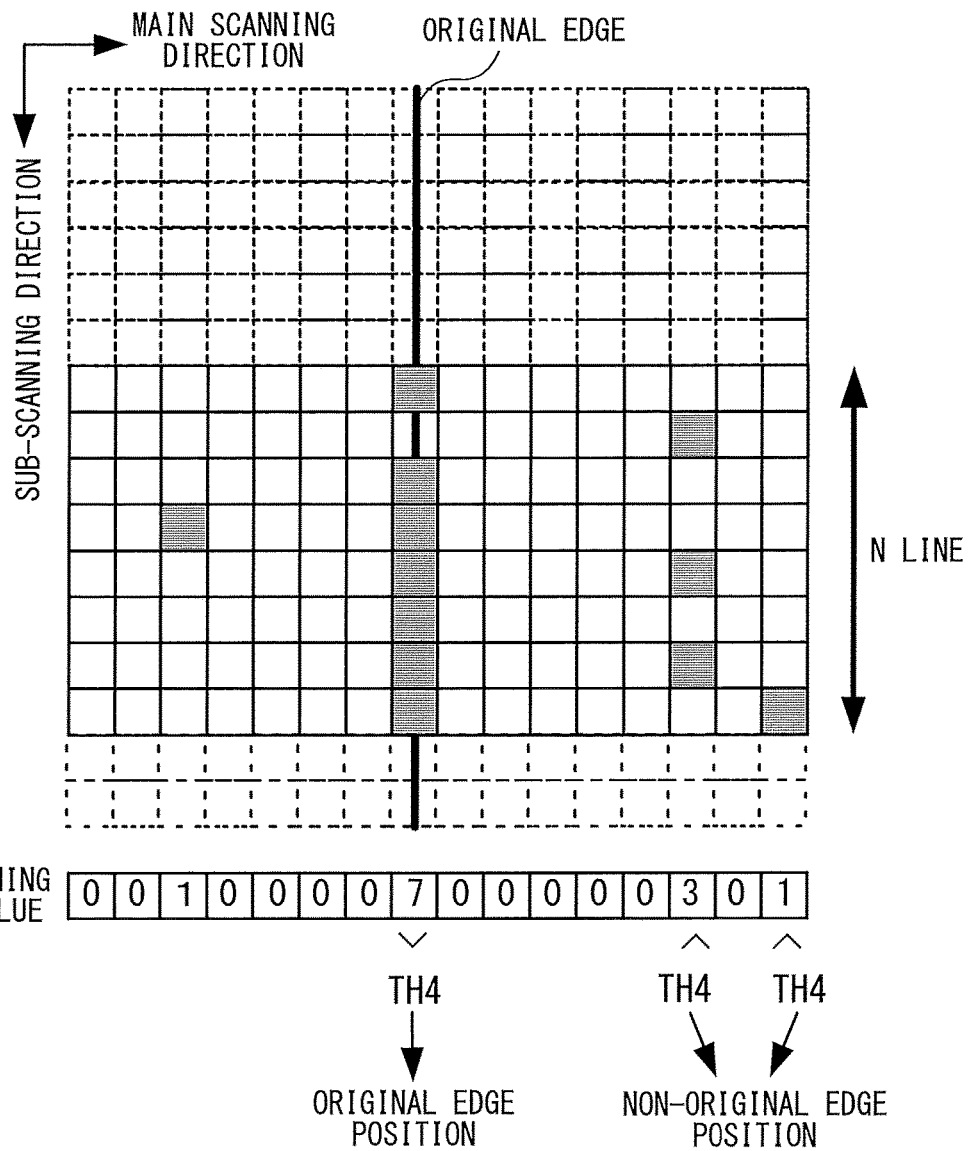
FIG. 7 is an explanatory diagram for illustrating original edge detection processing.

FIG. 6 and FIG. 7 are explanatory diagrams for illustrating the original edge detection processing in Step S509. The original size determination device 409 of the control unit 400 performs determination for each pixel to determine whether or not the pixel is an original edge, to thereby detect the original edge. The control unit 400 performs the following detection to detect the original edge with high accuracy even when dust, hair, or other dirt adheres to the original pressing member 105.

The original size determination device 409 uses three determination expressions to determine whether or not a pixel of interest subjected to the determination of the original edge is a pixel of the original edge (original edge pixel). A position of the pixel of interest in the main scanning direction is represented by "x", and a luminance value of the pixel of interest is represented by "f(x)". A luminance value for each pixel is included in image data. A first determination expression expresses a luminance difference value g(x) being a difference value between luminance values f(x+H1) and f(x−H1) of pixels located at two positions (x+H1) and (x−H1) that are each separated from the pixel of interest in the main scanning direction by a predetermined first distance H1.

$$g(x)=f(x+H1)-f(x-H1)$$

A second determination expression expresses a difference value h(x) between a maximum luminance value and a minimum luminance value of pixels within a range of a second distance H2, which is larger than the first distance H1, from the pixel of interest in the main scanning direction.

$$h(x)=\max(f(x-2H),\ldots f(x),\ldots f(x+H2))-\min(f(x-2H),\ldots f(x),\ldots f(x+H2))$$

A third determination expression expresses an average value i(x) of luminance values of pixels within a predetermined third distance H3 from the pixel of interest in the main scanning direction.

$$i(x)=\text{ave}(f(x+3H), \ldots, f(x), \ldots, f(x-H3))$$

The original size determination device 409 compares calculation results of the first to third determination expressions with first to third threshold values to perform determination of whether or not a pixel of interest is an original edge pixel.

The light emitting elements of the illumination portions 201a and 201b obliquely irradiate the original A with light. Therefore, a shadow may be caused at the original edge depending on the thickness of the original A. There is a luminance difference between the original edge and the original pressing member 105 due to this shadow. The luminance difference value g(x) is calculated to detect this luminance difference. The first threshold value TH1 is set to a value that enables the luminance value caused by the original edge to be distinguished from the luminance value caused by the original pressing member 105 serving as a background. In the case of the original edge, the absolute value of the luminance difference value g(x) is larger than the first threshold value TH1, and in the case of a part of the original pressing member 105 that is not the original edge, the absolute value of the luminance difference value g(x) is smaller than the first threshold value TH1. The first threshold value TH1 is set considering an original causing less shade and having a small basis weight.

The original size determination device 409 is capable of distinguishing a white streak in accordance with a change in sign of the luminance difference value g(x). A shadow of the original edge has a luminance lower than those of pixels therearound. Therefore, the sign of the luminance difference value g(x) changes from plus to minus as seen from an outer side in the main scanning direction. The white streak has a luminance higher than those of pixels therearound. Therefore, the sign of the luminance difference value g(x) changes from minus to plus as seen from the outer side in the main scanning direction. The original size determination device 409 distinguishes the white streak in accordance with the change in sign. As described above, the luminance difference value g(x) can be used for distinguishing the original edge from the original pressing member 105 and the white streak. However, the luminance difference value g(x) becomes larger also when dust, hair, or other dirt is read. Therefore, it is difficult for the original size determination device 409 to use the luminance difference value g(x) to distinguish the original edge from the pixel that is given when the dirt is read.

The original size determination device 409 compares the difference value h(x) with the second threshold value TH2 to distinguish the original edge from the pixel that is given when the dirt is read. A shadow caused by the original edge and a shadow caused by dirt often differ in luminance characteristics. The shadow caused by the original edge is a blurred shadow due to the influence of diffusion light of the illumination portions 201a and 201b. The shadow caused by dirt is clearer than the shadow caused by the original edge because the dirt itself is often dark. Therefore, the luminance value of the shadow caused by dirt is lower than the luminance value of the shadow caused by the original edge. That is, the difference value h(x) in a range including the shadow caused by the original edge is smaller than the difference value h(x) in a range including the shadow caused by dirt. Therefore, what causes the shadow can be determined by distinguishing the difference values h(x) by an appropriate second threshold value TH2. The second threshold value TH2 is set to such a value described above. However, with the luminance difference value g(x) and the difference value h(x), the original size determination device 409 may sometimes falsely detect an original edge of a black original without margin as dust, hair, or other dirt.

The original size determination device 409 compares the average value i(x) with a third threshold value TH3 to distinguish the original edge of the black original without margin from the pixel given when dirt is read. When the original A is a black original having no margin, the average value i(x) of the luminance values of the pixels within a predetermined range in the main scanning direction in the vicinity of the original edge is smaller than the average value i(x) in a case in which the luminance value caused by dirt is included. This is because the average value i(x) includes many luminance values of the original edge of the black original. Dirt is small or has a streak shape in many cases, and hence, when the average of the luminance values is calculated in a range that is large to some extent, only small influence is caused by the dirt, and the average i(x) includes many luminance values caused by the white color of the original pressing member 105. Therefore, the average value i(x) is increased when the luminance value caused by the dirt is included. What causes the shadow can be determined by distinguishing such average values i(x) by an appropriate third threshold value TH3. The third threshold value TH3 is set to such a value described above.

The original size determination device 409 performs determination with use of the luminance difference value g(x), the difference value h(x), and the average value i(x) in combination, thereby being capable of accurately distinguishing whether or not the pixel of interest is an original edge image. Further, as illustrated in FIG. 7, the original size determination device 409 counts the number of original edge pixels in a plurality of lines in the sub-scanning direction to suppress the influence of noise or other factors, thereby being capable of improving the detection accuracy for the original edge. When a plurality of original edge positions detected through the original edge detection are present, the original size determination device 409 sets a position on the outermost side as the original edge position. With this, the possibility of falsely detecting a table or a line in the original A as the original edge is reduced.

In FIG. 7, the original edge is detected based on the count number of candidate pixels of the original edge. The candidate pixel of the original edge is determined in the main scanning direction. The processing is repeated for N lines so that it can be determined whether or not the pixel at the same position in the main scanning direction is the candidate pixel of the original edge and at least a predetermined number of candidate pixels are present in the sub-scanning direction. The predetermined number corresponds to the fourth threshold value TH4. In the example of FIG. 7, there are seven candidate pixels of the original edge in the eighth pixels from the left end in the main scanning direction. Therefore, it is determined that the eighth pixels from the left end in the main scanning direction are the original edge. The candidate pixels of the original edge are present in the third pixel, the fourteenth pixels, and the sixteenth pixel from the left end in the main scanning direction, but the number of the candidate pixels is smaller than the predetermined number (fourth threshold value TH4), and hence the candidate pixels are not determined as the original edge. As described above, even when dirt that may cause false detection in one-line processing appears, the original edge can be detected with high accuracy while the influence by the dirt can be suppressed.

Figure 8:
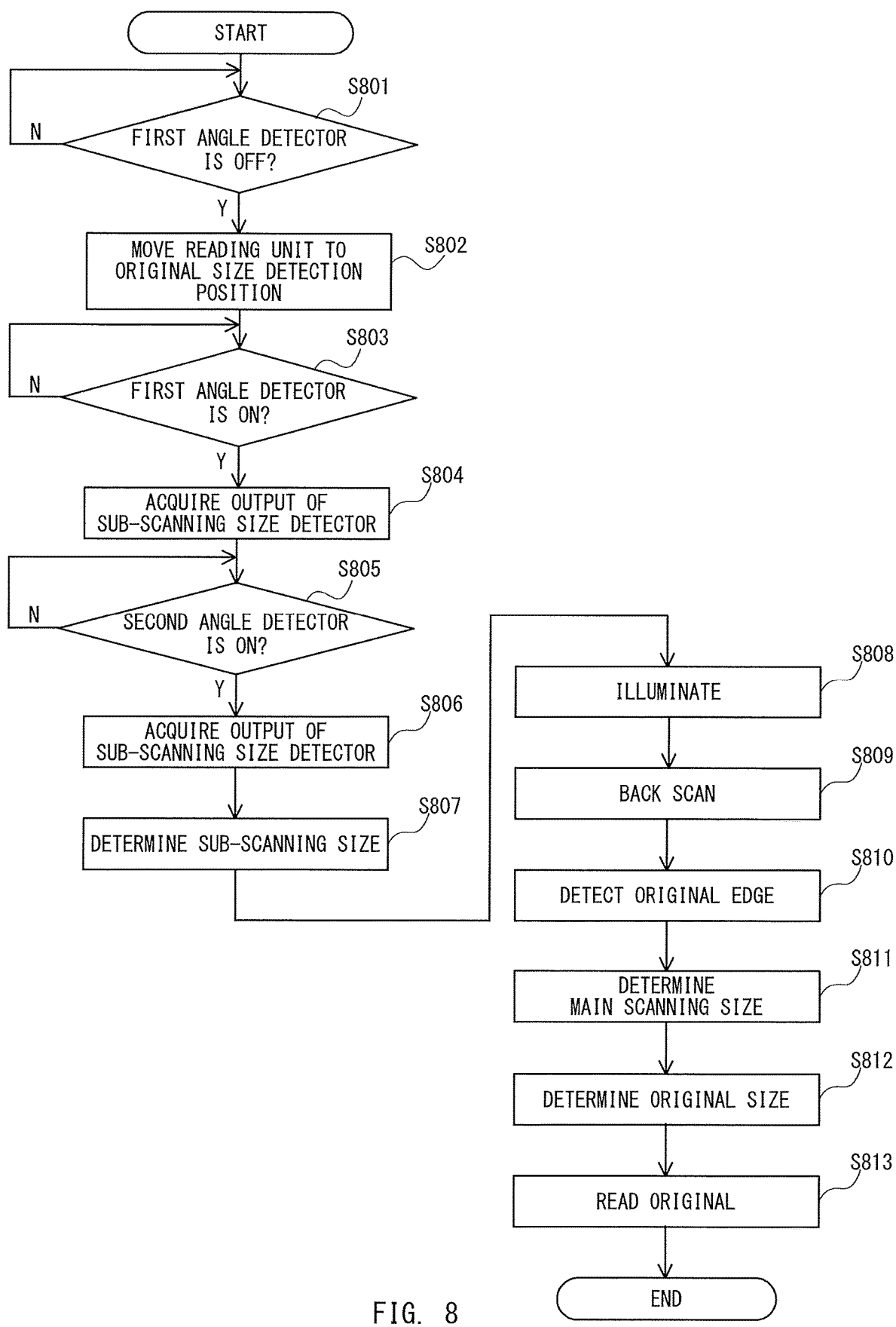
FIG. 8 is a flowchart for illustrating original image reading processing including original size detection processing.

FIG. 8 is another flowchart for illustrating original image reading processing including original size detection processing performed by the image reading apparatus 10. The processing of Step S801 to Step S804 is the same as the processing of Step S501 to Step S504, and hence description thereof is omitted.

The control unit 400 determines whether or not the platen cover 104 is closed with respect to the original table 102 to an angle equal to or smaller than the second angle based on a change in detection result acquired from the second angle detector 108 (Step S805). When the detection result by the second angle detector 108 is changed from the off-state to the on-state, the control unit 400 determines that the platen cover 104 is closed from the angle larger than the second angle to the angle equal to or smaller than the second angle with respect to the original table 102. When the platen cover 104 is closed to an angle equal to or smaller than the second angle (Step S805: Y), the control unit 400 acquires a detection result being an output of the sub-scanning size detector 109 (Step S806). The control unit 400 determines the size of the original A in the sub-scanning direction (Step S807) based on the detection result by the sub-scanning size detector 109 acquired in the processing of Step S804 and Step S806. After that, the control unit 400 executes the processing of Step S808 to Step S813, which is the same as the processing of Step S507 to Step S512 in FIG. 5, to determine the original size of the original A and read the original image of the original A. Image data representing the read original image is, for example, transmitted to the image forming apparatus 40 and used for the image forming processing on the recording material by the image forming device 411.

With regard to an original on which an image having such a density of not reflecting the invisible rays from the sub-scanning size detector 109 is formed, presence or absence of the original may be falsely detected. For such an original, in the processing of FIG. 8, the control unit 400 acquires detection results by the sub-scanning size detector 109 at a timing at which the platen cover 104 forms an angle of equal to or smaller than the first angle with respect to the original table 102 and at a timing at which the platen cover 104 forms an angle of equal to or smaller than the second angle with respect to the original table 102. When those two detection results are the same, the control unit 400 detects that the original is present. When those two detection results are different from each other, the control unit 400 detects that the original is absent. In such a manner, even for the original on which the image having such a density of not reflecting invisible rays is formed, the presence or absence of the original is accurately detected, and the size of the original in the sub-scanning direction can be determined.

Specifically, in a case of an original on which an image having a density of reflecting invisible rays is formed, the sub-scanning size detector 109 receives reflected light from the original when the angle of the platen cover 104 with respect to the original table 102 is at the first angle or the second angle. Therefore, the control unit 400 detects that the original is present. In the case of the original on which the image having such a density of not reflecting invisible rays is formed, the sub-scanning size detector 109 does not receive the reflected light from the original even when the angle of the platen cover 104 with respect to the original table 102 is at the first angle or the second angle. Therefore, the control unit 400 detects that the original is present. When the original is not placed, the reflected light from the original is not given at the first angle of the platen cover 104 with respect to the original table 102, and the reflected light from the platen cover 104 is given at the second angle. Therefore, the control unit 400 determines that the original is absent.

The image reading apparatus 10 having the configuration described above performs the processing of determining the size of the original A in the main scanning direction and the sub-scanning direction in accordance with the open/close state of the platen cover 104 at the time of the original size detection. The sub-scanning size detector 109 for detecting the size in the sub-scanning direction detects the presence or absence of the original with use of the invisible rays. Therefore, a user is prevented from being dazzled irrespective of the open/close state of the platen cover 104. The reading unit 103 for detecting the size in the main scanning direction does not radiate light from the illumination portion 201 unless the platen cover 104 forms an angle equal to or smaller than the second angle with respect to the original table 102. Therefore, dazzling of a user is suppressed to minimum.

The configuration for detecting the open/close state (angle) of the platen cover 104 with respect to the original table 102 is not limited to the configuration including the platen cover angle detection flag 106, the first angle detector 107, and the second angle detector 108. Any configuration may be employed as long as the first angle and the second angle of the platen cover 104 with respect to the original table 102 can be detected. For example, the first angle detector 107 and the second angle detector 108 may be formed of a single sensor, and an output of the sensor may be changed in accordance with the amount of change in position of the platen cover angle detection flag 106.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-086672, filed Apr. 25, 2017 which is hereby incorporated by reference herein in its entirety.

What is claimed is:

1. An image reading apparatus, comprising:
   an original table for placing an original subjected to reading;
   a platen cover mounted to the original table so as to be openable and closable with respect to the original table;
   an angle detector configured to detect a first state in which the platen cover forms a first angle with respect to the original table and a second state in which the platen cover forms a second angle smaller than the first angle with respect to the original table;
   a reader, which includes an illumination portion for irradiating the original placed on the original table with light and a light receiving portion for receiving reflected light of irradiated light reflected from the original, and is configured to read the original in a main scanning direction in accordance with the reflected light received at the light receiving portion;
   a sub-scanning size detector configured to detect presence or absence of an original placed on the original table by radiating invisible rays;
   an original size determination device configured to determine a size of the original in the main scanning direction in accordance with a reading result by the reader and determine a size of the original in a sub-scanning direction orthogonal to the main scanning direction in accordance with a detection result by the sub-scanning size detector; and a controller configured to:

control the original size determination device to acquire a detection result by the sub-scanning size detector in accordance with closing of the platen cover to a first state based on a detection result by the angle detector; and control the illumination portion to emit light in accordance with a change of the platen cover from the first state to a second state.

wherein the first detection is a result of the subscanning size detector which is obtained in response to the first state detected by the angle detector, wherein the second detection result is a detection result of the sub-scanning size detector which is obtained in response to the second state being detected by the angle detetor, and wherein the second angle is less than 15°.

2. The image reading apparatus according to claim 1, wherein the sub-scanning size detector includes a reflection type sensor, and wherein the angle detector defines an angle at which the sub-scanning size detector is prevented from falsely detecting the platen cover as the original as a first angle, and defines an angle that is less liable to cause light radiated by the reader to reach eyes of a user as a second angle.

3. The image reading apparatus according to claim 1, wherein the sub-scanning size detector is provided between two indices of two reference sizes in the sub-scanning direction, and wherein the original size determination device is configured to determine whether a size of the original in the sub-scanning direction is equal to or larger than a larger reference size or is equal to or smaller than a smaller reference size in accordance with a detection result by the sub-scanning size detector.

4. The image reading apparatus according to claim 1, wherein the sub-scanning size detector includes a plurality of sub-scanning size detectors that are arrayed in the sub-scanning direction, and wherein the original size determination device determines a size of the original in the sub-scanning direction in accordance with detection results by the plurality of sub-scanning size detectors.

5. The image reading apparatus according to claim 1, wherein the original size determination device is configured to:

calculate, based on a reading result of the original for a predetermined number of lines read by the reader, a first difference value and a second difference value;

wherein the first difference value is a value between luminance values of two pixels that are each separated from a pixel of interest at a predetermined position in the main scanning direction by a first distance; and wherein the second difference value is a value between a maximum luminance value and a minimum luminance value within a range of being separated from the pixel of interest by a second distance larger than the first distance;

determine whether or not the pixel of interest is an original edge based on the first difference value and the second difference value; and detect a size of the original in accordance with a position of the pixel of interest in a case where the pixel of interest is the original edge.

6. An original size detection method, which is performed by an apparatus including:

an original table for placing an original subjected to reading;

a platen cover, which is mounted to the original table so as to be openable and closable with respect to the original table;

a reader, which includes an illumination portion for irradiating the original placed on the original table with light and a light receiving portion for receiving reflected light of irradiated light reflected from the original, and is configured to read the original in a main scanning direction in accordance with the reflected light received at the light receiving portion; and a sub-scanning size detector, which is configured to detect presence or absence of an original placed on a predetermined position of the original table by radiating invisible rays, the original size detection method comprising:

determining a size of the original based on a reading result by the reader and first and second detection results by the sub-scanning size detector; and causing the illumination portion to emit light in accordance with a change of an angle, with respect to the original table, of the platen cover from a first angle to a second angle, the second angle being smaller than the first angle, wherein the first detection result is a detection result of the sub-scanning size detector which is obtained in response to the first angle of the platen cover being detected, wherein the second detection result is a detection result of the sub-scanning size detector which is obtained in response to the second angle of the platen cover being detected, and wherein the second angle is less than 15°.

7. The original size detection method according to claim 6, wherein the sub-scanning size detector includes a reflection type sensor, and wherein the method further comprises detecting, when the platen cover forms the first angle, which prevents the platen cover from being falsely detected as the original, with respect to the original table, and when the platen cover forms the second angle, which is less liable to cause light radiated by the reader to reach eyes of a user, presence or absence of the original placed on the original table.

8. The original size detection method according to claim 6, in which the sub-scanning size detector is provided between two indices of two reference sizes in the sub-scanning direction, further comprising determining, by the original size determination device, whether a size of the original in the sub-scanning direction is equal to or larger than a larger reference size or is equal to or smaller than a smaller reference size in accordance with a detection result by the sub-scanning size detector.

9. The original size detection method according to claim 6, in which the sub-scanning size detector includes a plurality of sub-scanning size detectors that are arrayed in the sub-scanning direction, further comprising determining, by the original size determination device, a size of the original in the sub-scanning direction in accordance with detection results by the plurality of sub-scanning size detectors.

10. The original size detection method according to claim 6, further comprising:
- calculating, by the apparatus, based on a reading result of the original for a predetermined number of lines read by the reader, a first difference value and a second difference value;
  - wherein the first difference value is a value between luminance values of two pixels that are each separated from a pixel of interest at a predetermined position in the main scanning direction by a first distance; and
  - wherein the second difference value is a value between a maximum luminance value and a minimum luminance value within a range of being separated from the pixel of interest by a second distance larger than the first distance;
- determining, by the apparatus, whether or not the pixel of interest is an original edge based on the first difference value and the second difference value; and
- detecting, by the apparatus, a size of the original in accordance with a position of the pixel of interest when the pixel of interest is the original edge.

\* \* \* \* \*